United States Patent Office 3,497,459
Patented Feb. 24, 1970

3,497,459
PROCESS FOR PRODUCING WATER SOLUBLE
BASIC SALTS OF ALUMINUM AND/OR IRON
Tamotsu Nakamura, Akashi, and Michiaki Matsu, Kobe,
Japan, assignors to Taki Fertilizer Manufacturing Co.,
Ltd., Kakogawa, Japan
No Drawing. Filed Dec. 6, 1966, Ser. No. 599,400
Claims priority, application Japan, Dec. 9, 1965,
40/75,262; Oct. 8, 1966, 41/65,922
Int. Cl. C01g *49/00;* C01f *7/00;* B01j *13/00*
U.S. Cl. 252—317
10 Claims

ABSTRACT OF THE DISCLOSURE

Process for producing basic salts of the general formula $$R_n(OH)_m X_{3n-m}$$

wherein R is Al and/or trivalent Fe, X is a monovalent acid radical selected from Cl and $NO_3$, $3n$ is larger than $m$ and the chemical equivalent ratio of R/X or $3n/3n-m$ is about 1.5 to 4.0, which involves decomposing a material containing aluminum and/or iron, such as bauxite, with either hydrochloric or nitric acid and also with sulfuric acid; adding to the resulting solution a basic material such as barium hydroxide to convert the soluble sulfates into an insoluble sulfate salt thereof, removing the insoluble sulfate precipitate thus-formed, and recovering the solution of said basic salt.

---

This invention relates to a process for producing water-soluble basic salts containing aluminum and/or iron. More particularly the present invention relates to a process for producing a water-soluble basic salt suitable for various uses specifically as coagulants for the purification or clarification of supply water and waste water and represented by the general formula:

$$R_n(OH)_m X_{3n-m}$$

wherein R is Al and (or) trivalent Fe, X is a monovalent acid radical selected from Cl and $NO_3$, $3n$ is larger than $m$ and the chemical equivalent ratio of R/X or $3n/3n-m$ is in a range of about 1.5 to 4.0.

Various processes are known for producing basic salts of aluminum or iron. For example, as processes for producing basic aluminum chloride, there are known (1) a method wherein metallic aluminum is reacted with less than the equivalent of hydrochloric acid and (2) a method wherein $Cl^-$ ions are removed from aluminum chloride by passing the aluminum chloride through an ion exchange resin membrane.

However, these conventional methods have drawbacks in that costly materials are used and that complicated operations are required.

Further, it is also known to produce basic chlorides of aluminum or iron by treating bauxite or an iron-containing material with less than the equivalent of hydrochloric acid containing fluorine ions or fluorine complex ions to obtain the desired basic chloride. If desired an alkali or aluminum hydroxide is added so that the chemical equivalent ratio of Al/Cl or Fe/Cl of the resulting product may be increased.

However, in such process, in order to extract aluminum and/or iron from the raw materials economically at high yields, it is necessary to employ the acid in an amount approaching the chemical equivalent and therefore it is inevitable that the equivalent ratio of R/Cl of the extract approaches 1.0, when R represents Al or Fe.

Further, when $Cl^-$ is neutralized with the addition of an alkali, not only the costly $Cl^-$ will be lost but also, for example, in case such calcium compound as calcium carbonate or calcium hydroxide is used, calcium chloride will coexist as an excess ingredient in the final product and therefore various defects exists, such as the pH of the product is reduced and the stability is impaired.

An object of the present invention is to provide a process for producing a water-soluble basic salt which has a large amount of $Fe^{3+}$ ion, and small amount of $Cl^-$ ion and a structure containing an OH radical, and which is an inorganic high molecular weight compound of a complex salt structure and has a cross-linkability by an $Al^-$ bond and a high positive charge.

Another object of the invention is to provide a process for producing a coagulant which is highly stable for a prolonged period of time and is more effective than any conventional inorganic coagulant when used for the clarification and purification of supply water or waste water.

A further object of the invention is to provide a process for industrially advantageously producing a basic salt which is higher in pH value than any conventional aluminum and iron-containing basic salts and which contains very little undesirable coexisting salt. Further, easily available raw materials may be used in the present process and an inexpensive apparatus may be utilized. Moreover, the operation of the present process is relatively simple.

Briefly, the present invention is concerned with the production of water-soluble basic salts represented by the following general formula:

$$R_n(OH)_m X_{3n-m}$$

wherein R is Al and/or trivalent Fe, X is a monovalent acid radical selected from Cl and $NO_3$, $3n$ is larger than $m$ and the chemical equivalent ratio of R/X or $3n/3n-m$ is in the range of about 1.5 to 4.0, by treating an aluminum and/or iron-containing material with a monovalent strong inorganic acid selected from hydrochloric and nitric acid and with sulfuric acid so that aluminum and/or iron in the raw material is dissolved out as the corresponding salts, adding water to dilute the solution as desired, normally separating and removing the insoluble residue, then adding to the resulting solution a substance which can render sulfuric acid ions in said solution insoluble so as to react, and finally separating the insoluble sulfate precipitate and recovering the solution of the desired basic salt.

The important feature of the present invention is in the fact that the raw material such as bauxite or the like is treated with the above mentioned two different acids and then the sulfate ion in the system is removed as an insoluble precipitate. This process temporarily involves a system wherein sulfuric acid ions coexist with the basic aluminum salt of hydrochloric acid or nitric acid and therefore the possibility of the formation of a basic aluminum sulfate precipitate has initially been anticipated, because it is known that basic aluminum sulfate is insoluble when the chemical equivalent ratio of $Al/SO_4$ is above a certain value. For example, on pages 253 to 258, J. Pharm. Society (Japan), vol. 74, it is described that when the chemical equivalent ratio of $Al/SO_4$ is larger than 1.27, basic aluminum sulfate becomes an insoluble precipitate of a fixed composition irrespective of said chemical equivalent ratio. Further, the same teaching is mentioned also on pages 89 to 69 of Z. Anorg. Allgem. Chem., vol. 267 (1951) and in vol. 269 (1951) of the same literature. As the reaction course of the present invention naturally passes through a stage in which the chemical equivalent ratio of $Al/SO_4$ is larger than 1.27 it has been considered that the precipitation of basic aluminum sulfate as is mentioned above, will be formed. However, it has been unexpectedly and surprisingly found, through various and extensive experiments, that no formation of such precipitate is seen at all in the process of the invention and that the desired water-soluble basic salt can be produced without any trouble. The present invention is based on this unexpected finding.

In carrying out the method of this invention, any aluminum and/or iron-containing material which can be digested with hydrochloric acid (or nitric acid) and sulfuric acid to form the corresponding aluminum or iron salts in the acid can be utilized. Typical examples of such materials are minerals or ores containing aluminum and/or iron, such as bauxite, kaolin, alumite, allophane, etc. among which bauxite is most preferable. Further, aluminum and/or iron-containing material formed as the by-product or waste from various industries may also be used in the present invention. Examples of such materials are filter cake formed in the electrolysis of alumina, red mud formed in the alkali treatment of bauxite, waste formed in the mechanical processing of aluminium articles, pilite, etc.

Since bauxite is a typical and most preferable material, the present invention shall be explained in more detail by referring to bauxite as the material containing aluminum and iron. Similarly, hydrochloric acid will be taken as an example of the monovalent strong acid in the following description.

In the present invention, one particular method of decomposing or digesting bauxite with hydrochloric acid and sulfuric acid is to treat the bauxite with a mixture of these acids. In such case, the chemical equivalent ratio of the total content of aluminum and iron in bauxite to the amount of the acids, that is, the chemical equivalent ratio of $R/Cl+SO_4$ (R represents Fe and Al) should be in the range of about 0.8 to 1.4. Even if this value is made smaller than 0.8, the rate of decomposition of $R_2O_3$ in the raw material will not be improved and the amount of the reaction solution will become unnecessarily large. It is therefore disadvantageous. Further, when it is larger than 1.4, the amounts of the acids is insufficient and the rate of decomposition and extraction of $R_2O_3$ will not be high enough. Therefore, the above mentioned range of $R/Cl+SO_4$ is important.

The ratio of hydrochloric acid to sulfuric acid in the above mentioned acid mixture may be properly selected depending on the chemical equivalent ratio of $R/Cl$ desired in the final product. However, if the amount of hydrochloric acid is too large, the basic salt of the product of the present invention will be reduced and, in case it is used as, for example, a coagulant, no more remarkable effect than of aluminum chloride will appear. On the contrary, if said amount is too small, iron and then aluminum will be hydrolyzed and the stability of the final product will be reduced. Therefore, it is desirable to use such amount of hydrochloric acid that the chemical equivalent ratio of $R/Cl$ is in the range of about 1.5 to 4.0. The balance should be sulfuric acid.

In decomposing bauxite with a mixture of hydrochloric acid and sulfuric acid in the above mentioned amounts, it is the usual procedure to mix the hydrochloric acid and sulfuric acid together and the bauxite powder is then added and mixed therewith. The reaction is allowed to proceed for about 1.5 to 3.0 hours at 80–105° C. while stirring. In such case, an exothermic reaction occurs and the temperature of the system will rise to above 100° C. and the $R_2O_3$ decomposition rate will reach about 95 to 99%.

In order to obtain the desired value 0.8–1.4 in respect to $R/Cl+SO_4$, it is preferable to mix hydrochloric acid and sulfuric acid in such proportions that the $Cl/SO_4$ chemical equivalent ratio in the acid mixture is 2.0–0.3.

In the above mentioned acid decomposition, the acid concentration may be so selected that the concentration of the metal in the resulting slurry as $R_2O_3$ is less than about 13%. In some cases, it is possible to use an acid concentration higher than that. In such a case, the slurry resulting from the decomposition may be properly diluted with water. This is no critical lower limit for the $R_2O_3$ concentration in the slurry. However, if it is too low, the reaction apparatus will have to be unduly voluminous and the concentration of the product will be reduced. Therefore, from the practical point of view, the lower limit may be about 3% as $R_2O_3$.

Usually, silica, or the like, will be present as an insoluble residue in the slurry resulted from the decomposition reaction and should be removed by filtration or any other ordinary method. In some case, it will be preferable to remove it while keeping the entire system warm.

Another embodiment for the decomposition of the aluminum and/or iron containing material, according to this invention, is to employ hydrochloric acid and sulfuric acid separately rather than as a mixture of these acids. This mode of working is advantageous because the separation of insoluble residue is more easy.

That is to say, bauxite is separately decomposed with hydrochloric acid, and sulfuric acid so that aluminum and iron in the bauxite may be respectively dissolved out. Then, the respective solutions are diluted as required, the insoluble residue is removed and then both solutions are combined at a proper ratio according to the chemical equivalent ratio of $R/Cl$ mentioned hereinbefore.

More particularly, the equivalent ratios of the total content of aluminum and iron in bauxite to the amounts of the respective acids, that is, the chemical equivalent ratios of $R/Cl$ and $R/SO_4$ should be so made as to be respectively about 1.0 to 1.4 and about 0.8 to 1.1. In the case of the hydrochloric acid treatment, even if the chemical equivalent ratio of $R/Cl$ is made smaller than about 1.0, the decomposition rate will not be increased with an increase in the loss of Cl. If the said ratio is made larger than 1.4, the reduction of the decomposition rate will become remarkable. Therefore, the ratio $R/Cl$ should be kept between 1.0–1.4.

In the case of the sulfuric acid treatment, if the chemical equivalent ratio of $R/SO_4$ is made smaller than about 0.8, aluminum sulfate will be crystalized out, whie if it is made larger than about 1.1, the formation of insoluble substance will increase.

When bauxite is treated separately with hydrochloric acid and sulfuric acid in amounts within the above described ranges, an exothermic reaction occurs by which the bauxite is easily decomposed due to exothermic reaction at a temperature between 80–105° C. and the decomposition rate of each of the $R_2O_3$ components will reach about 95 to 99%. Then each treating solution is diluted as desired. The insoluble residue in each treating solution is then easily separated by such method as filtration.

After the above procedure, the respective treating solutions are combined in such proportions as leading to basicity desired in the final product. That is to say, in mixing the above mentioned treating solutions, the mixing ratio may be properly adjusted depending on the basicity desired in the final product. But, if the amount of the hydrochloric acid treated solution is too large, the relative amount of $SO_4^{--}$ will become too small, with the result that the chemical equivalent ratio of $R/Cl$ will be reduced. Hence, salt of the product of the present invention will be reduced and the produce will not be an effective coagulant. On the contrary, if the amount of the hydrochloric acid treated solution is to small, the relative amount of $SO_4^{--}$ will become too large with the result that the chemical equivalent ratio of $R/Cl$ will be so high that iron and then aluminum will hydrolyze, and consequently the stability of the product will be reduced. Therefore, both solutions should be mixed together in such proportions that the chemical equivalent ratio of $R/Cl$ of the final product will be in the range of about 1.5 to 4.0. It is necessary that the concentration of $R_2O_3$ in the solution obtained by the above step be less than about 13%.

Generally, a desired result is obtained if the both solutions are mixed in such proportions that the $Cl/SO_4$ chemical equivalent ratio in the total Fe and/or Al compounds contained in the resulting solution mixture is 2.0–0.3.

In the above embodiment, where bauxite is treated separately with a monovalent acid such as hydrochloric acid and sulfuric acid, a part or whole of the sulfuric acid treated solution may be replaced with an ordinary aluminum sulfate solution.

Thus, for example, when bauxite is decomposed or digested with hydrochloric acid or nitric acid in the manner described above, and the resulting solution may be mixed with a solution of aluminum sulfate produced by the conventional method for example, by reacting aluminum hydroxide with sulfuric acid in an aqueous medium. In this case, the concentration of the aluminum sulfate solution may be such that, when it is combined with the other bauxite decomposed hydrochloric acid solution, no crystals of aluminum sulfate are deposited. The other conditions may be the same as in the case where bauxite is decomposed with sulfuric acid.

In any case, there is obtained a solution containing aluminum and/or iron chloride (or nitrate) and aluminum and/or iron sulfate. According to the present invention, the sulfate ion is converted into an insoluble salt, which is removed from the solution. In order to accomplish this, there is added a bivalent metal compound which reacts with the sulfate ion to form the insoluble salt. Examples of such bivalent compounds are those of calcium and barium, such as calcium carbonate, slaked lime, quicklime, dolomite, calcium silicate, barium carbonate, barium hydroxide, etc. among which calcium carbonate is preferable.

When the equivalent of the above mentioned compound is used with respect to the sulfate ion contained in the solution, an insoluble sulfate will start to precipitate. The precipitate is separated and removed by such method as filtration.

If desired, it is possible to add the above mentioned compound or neutralizing agent in an amount somewhat smaller than the equivalent amount of sulfuric acid ions so that a part of the sulfuric acid ions may remain in the solution. In such case, if the amount of the neutralizing compound is too small, the stability of the resulting product will be adversely affected. Therefore, it is generally preferable to keep the remaining amount of sulfuric acid ions at about 3.0% or preferably below about 2.0%.

The solution of basic salt of aluminum thus obtained is transparent, and is stable for a prolonged period of time. For example, the solution of the basic aluminum salt is stable even left at −5° C. for 3 months and at normal temperatures for one year. Further, in case the solution was left at 100° C., though differing somewhat depending on the equivalent ratio, it has been found that at an equivalent ratio of 3.0, it remained stable for up to 10 hours.

The pH value of the basic salt of aluminum obtained by the method of the present invention varies depending on the basicity and concentration. For example, the pH is 2.80 at a chemical equivalent ratio R/X of 2.3 and 9.72% $R_2O_3$, and the pH is 2.90 at a chemical equivalent ratio R/X of 2.54 and 10.0% $R_2O_3$.

On the other hand, the pH value of a basic salt obtained by the neutralization with calcium carbonate of a solution resulting from the decomposition of bauxite with hydrochloric acid is 1.35 and 1.50 respectively under substantially the same conditions mentioned above. Therefore, the pH value of the product of the present invention is about 1.5 higher than that of the latter. Therefore, the product of the present invention is not only very low in corrosiveness but also, when it is used as a coagulant, no alkaline auxiliary agent is required or the amount of alkaline material may be very small.

Further, the product of the present invention can be made in a concentrated solution or in powder form. On the other hand, the separated calcium sulfate or barium sulfate formed in the neutralization can be utilized for such uses as for construction materials, pigments and fillers.

Examples of the present invention and some coagulation tests with products of the present invention are given in the following examples but the present invention is not to be limited by these examples.

EXAMPLE 1

Composition and particle size of raw material bauxite:

Firing loss—30.15%.
Composition—50.0% $Al_2O_3$, 12.4% $Fe_2O_3$, 4.5% $SiO_2$, 0.25% CaO.
Particle size—60% passing through 200 meshes.

For 10 g. of the above bauxite powder, hydrochloric acid (36.0% HCl) and sulfuric acid (50.0% $H_2SO_4$) in the respective amounts shown in the following Table 1 were charged into a reactor and were mixed together. The mixture was heated to 95° C. The above mentioned bauxite powder was put into the acid mixture. The mixture was stirred to react for 2 hours. Then the insoluble residue was filtered while keeping the temperature at 60° C. Then, calcium carbonate in an amount required to convert sulfuric acid ion in the solution into insoluble calcium sulfate was added to the filtrate. The neutralization reaction was conducted for 30 minutes, and then the mixture was allowed to cool to the room temperature. The precipitate was removed by filtration and washed with water to obtain a brown transparent solution of a basic chloride containing aluminum and iron. The compositions and amounts of such solutions are shown in Table 2.

TABLE 1.—AMOUNTS OF USED MATERIALS

| | Hydrochloric acid (g.) | R/Cl (N) ratio | Sulfuric acid (g.) | R/Cl+ $SO_4$ (N) ratio | $CaCO_3$ (g.) |
|---|---|---|---|---|---|
| (A) | 139 | 2.5 | 198 | 1.0 | 100 |
| (B) | 139 | 2.5 | 158 | | 80 |
| (C) | 115 | 3.0 | 222 | 1.0 | 112 |
| (D) | 115 | 3.0 | 177 | | 90 |

TABLE. 2—COMPOSITIONS (PERCENT) AND AMOUNTS (g.) OF BASIC CHLORIDE SOLUTIONS

| | $Al_2O_3$ | $Fe_2O_3$ | Cl | $SO_3$ | CaO | pH | R/Cl (N) ratio | Amount of solution (g.) |
|---|---|---|---|---|---|---|---|---|
| (A) | 7.88 | 2.06 | 8.05 | 0.85 | 0.52 | 2.85 | 239 | 600 |
| (B) | 7.85 | 1.97 | 8.61 | 0.85 | 0.60 | 2.70 | 223 | 560 |
| (C) | 8.00 | 1.95 | 6.80 | 0.91 | 0.61 | 3.10 | 280 | 590 |
| (D) | 8.17 | 1.75 | 7.10 | 0.87 | 0.55 | 3.05 | 273 | 570 |

When the products A to D were allowed to stand at −5° C. for 3 months and at the normal temperature for one year, the stability did not vary. When they were left to stand at 100° C. in the same maner, the products A and B remained stable for more than 14 hours and the products C and D remained stable for more than 10 hours.

EXAMPLE 2

100 g. of kaolin having a composition of 38.5% $Al_2O_3$ and 1.1% $Fe_2O_3$ were added to a mixed acid of 190 g. of nitric acid (30% $HNO_3$) and 170 g. of sulfuric acid (40% $H_2SO_4$) and the temperature was raised to about 105° C. due to the exothermic reaction. The mixture was allowed to react while stirring for 2 hours. The insoluble residue was then filtered and separated, and 68 g. of calcium carbonate were added in the form of a slurry to the filtrate. The filtrate was stirred to react and then the precipitate formed was filtered off and was washed with water to obtain 450 g. of a transparent solution of a basic salt containing aluminum and iron. The composition and pH of this solution were as follows:

Composition—7.78% $Al_2O_3$, 0.20% $Fe_2O_3$, 12.21% $NO_3$, 0.95% $SO_3$, 0.62% CaO.
pH—2.73.
$R_2O_3/NO_3$ (N) ratio—2.33.

EXAMPLE 3

100 g. of bauxite (of the same composition as in Example 1) were added to a mixed acid of 167 g. of hydrochloric acid (30% HCl) (chemical equivalent ratio of Al/Cl of 2.5) and 247 g. of sulfuric acid (40% $H_2SO_4$), and the mixture was treated in the same manner as in the preceding example. Then 200 g. of barium carbonate were added thereto and the mixture was stirred to react, was then filtered and washed with water to obtain 650 g. of a transparent solution. The composition and pH of the solution were as follows:

Composition—7.23% $Al_2O_3$, 1.90% $Fe_2O_3$, 7.42% Cl, 0.01% $SO_3$.
pH—2.85.
$R_2O_3/Cl$ ratio—2.40.

EXAMPLE 4

100 g. of bauxite (of the same composition as in Example 1) were added to a mixed acid of 200 g. of hydrochloric acid (25% HCl) (chemical equivalent ratio Al/Cl of 2.5) and 332 g. of sulfuric acid (30% $H_2SO_4$), and the mixture was treated for decomposition in the same manner as in the preceding example. Then 160 g. of calcium silicate (35% CaO) were added thereto and the mixture was treated in the same manner as in the preceding example to obtain 750 g. of a solution of a basic salt. The composition and pH of the solution were as follows:

Composition—6.15% $Al_2O_3$, 1.62% $Fe_2O_3$, 6.45% Cl, 0.81% $SO_3$, 0.51% CaO.
ph—2.85.
$R_2O_3/Cl$ (N) ratio—2.38.

EXAMPLE 5

In this example, the following materials were used. Composition and mesh size of bauxite:

Firing loss—30.15%.
Composition—50.0% $Al_2O_3$, 12.4% $Fe_2O_3$, 4.5% $SiO_2$, 0.25% CaO.
Particle size—60% passing through 200 meshes.
Composition of acids used—hydrochloric acid, 36.0% HCl; sulfuric acid; 50% $H_2SO_4$.

500 g. of the above bauxite powder and 1600 g. of sulfuric acid were mixed together and were allowed to react at 80 to 100° C. for 3 hours while being stirred. After the reaction, the mixture was diluted with 1400 g. of water, the insoluble residue was separated by filtration to obtain a filtrate which is referred to as solution I. The composition of the solution I was 7.5% $Al_2O_3$, 1.5% $Fe_2O_3$ and 20.5% $SO_3$.

Apart from the above, 540 g. of bauxite and 1400 g. of hydrochloric acid were mixed together and were allowed to react at 80 to 100° C. for 3 hours while being stirred. After the reaction, the mixture was diluted with 460 g. of water, and the insoluble residue was separated by filtration to obtain a filtrate which is referred to as solution II. The composition of the solution II was 9.0% $Al_2O_3$, 2.0% $Fe_2O_3$ and 21.0% Cl.

140 g. of the above mentioned solution I and 100 g. of the solution II were mixed together, and calcium carbonate in an amount required to convert the used sulfuric acid into calcium sulfate, at the normal temperature. Then then mixture was filtered to obtain a brown transparent solution of a basic chloride containing aluminum and iron.

The composition of the solution thus obtained was 9.24% $Al_2O_3$, 1.74% $Fe_2O_3$, 10.17% Cl, 1.04% $SO_3$ and 0.84% CaO, its pH was 2.6 and Al/Cl (N) ratio was 3.26.

EXAMPLE 6

250 g. of bauxite used in Example 1 and 800 g. of sulfuric acid were mixed together and were allowed to react at 80 to 100° C. for 3 hours while being stirred. After the reaction, the mixture was diluted with 700 g. of water, and then 1250 g. of the solution II obtained in Example 5 were mixed therewith. Then calcium carbonate in an amount required to convert the used sulfuric acid into calcium sulfate was immediately added thereto and the mixture was filtered to obtain a brown transparent solution of a basic chloride containing aluminum and iron.

The composition of the solution thus obtained was 9.40% $Al_2O_3$, 1.81% $Fe_2O_3$, 10.13% Cl, 0.62% $SO_3$ and 1.33% CaO, its pH was 2.59 and Al/Cl (N) ratio was 2.9.

When the products in the above Examples 5 and 6 were left at −5° C. for 3 months and at the normal temperature for one year, the stability did not vary. When they were left at 100° C. in the same manner, they remained stable for more than 10 hours.

EXAMPLE 7

1750 g. of an aluminum sulfate solution containing 7.5% $Al_2O_3$ and 1250 g. of the solution II obtained in Example 5 were mixed together, and calcium carbonate in an amount required to convert the sulfuric acid ions in said mixed solution into calcium sulfate was added thereto to react. Then the mixture was filtered to obtain a brown transparent solution of a basic chloride containing aluminum and iron.

The composition of the solution thus obtained was 9.76% $Al_2O_3$, 0.85% $Fe_2O_3$, 10.45% Cl, 0.89% $SO_3$ and 1.10% CaO, its pH was 2.50 and Al/Cl (N) ratio was 2.58.

Reference Example 1

In order to determine the coagulating effects of the products of this invention, solutions A and D of basic chlorides of aluminum and iron obtained in the above mentioned Example 1 were used to treat supply water. Thus jar tests were conducted as follows.

Taking Kakogawa River water (turbidity 20°, pH 7.6, temperature 20° C.), there were added various coagulants. After the addition the water was stirred at 90 r.p.m. for 5 minutes and then at 30 r.p.m. for 15 minutes. After the lapse of 5 minutes, the supernatant liquid was taken and its turbidity and rate of decolorization were measured. The results are shown in the following table.

| Coagulants | Added amount (p.p.m. as $R_2O_3$) | States after treatment | |
|---|---|---|---|
| | | Turbidity | pH |
| Aluminum sulfate (commercial). | 2.0 | 9.5 | 7.5 |
| | 3.0 | 4.0 | 7.3 |
| | 4.0 | 3.0 | 7.2 |
| | 6.0 | 1.5 | 7.0 |
| Ferric sulfate (commercial). | 3.0 | 11.5 | 7.2 |
| | 4.0 | 7.0 | 7.0 |
| | 6.0 | 3.0 | 6.1 |
| Product A, Example 1 | 1.0 | 4.0 | 7.6 |
| | 2.0 | 1.5 | 7.55 |
| | 3.0 | 1.0 | 7.50 |
| Product D, Example 1 | 1.9 | 4.0 | 7.6 |
| | 2.0 | 1.5 | 7.55 |
| | 3.0 | 1.0 | 7.50 |

A further test was conducted in the same manner but in respect of well water (pH 7.85, temperature 19° C.)

rich in manganese and iron. The results are shown in the following table.

| Coagulants | Added amount (p.p.m. as $R_2O_3$) | States after treatment | |
|---|---|---|---|
| | | Turbidity | pH |
| Aluminum sulfate (commercial). | 8.0 | 13.5 | 7.60 |
| | 9.0 | 12.1 | 7.55 |
| | 10.0 | 18.5 | 7.50 |
| Product D, Example 1 | 3.0 | 1.5 | 7.75 |
| | 3.5 | 1.0 | 7.75 |
| | 4.0 | 1.0 | 7.75 |

Reference Example 2

The results of other jar tests made for the products of the invention in comparison with conventional basic aluminum chloride and aluminum sulfate also showed that the products of the invention are superior in coagulating effects to the conventional coagulants. Thus, taking test water, the various coagulants were added. Then the water was stirred at 90 r.p.m. for 5 minutes and then at 30 r.p.m. for 15 minutes and then, in 5 minutes, the supernatant liquid was taken and its turbidity and rate of decolorization were measured.

Water (artificial water) containing iron ($Fe_2O_3$ 20 p.p.m.) and of a turbidity of 48.2 degrees, pH of 7.60:

| Coagulants | Added amounts (p.p.m. as $Al_2O_3$) | States after treatment | |
|---|---|---|---|
| | | Turbidity | pH |
| Aluminum sulfate (commercial). | 2 | 39.5 | 6.4 |
| | 3 | 36.2 | 6.35 |
| | 4 | 31.1 | 6.25 |
| | 5 | 27.2 | 6.15 |
| | 6 | 26.2 | 6.05 |
| | 7 | 24.1 | 5.89 |
| | 8 | 23.0 | 5.76 |
| | 10 | 17.8 | 5.65 |
| Conventional basic aluminum chloride. | 2 | 6.5 | 6.56 |
| | 3 | 3.5 | 6.50 |
| | 4 | 1.9 | 6.46 |
| | 5 | 1.3 | 6.40 |
| | 6 | 1.1 | 6.34 |
| | 7 | 0.9 | 6.25 |
| | 8 | 0.8 | 6.18 |
| | 10 | 0.7 | 6.22 |
| Product of Example 5 | 2 | 2.6 | 6.58 |
| | 3 | 2.2 | 6.52 |
| | 4 | 1.7 | 6.48 |
| | 5 | 1.2 | 6.42 |
| | 6 | 1.0 | 6.37 |
| | 7 | 0.9 | 6.30 |
| | 8 | 0.8 | 6.22 |
| | 10 | 0.7 | 6.25 |

Raw water taken at the Befu River turbidity of 40.0 degrees, pH of 6.9:

| Coagulants | Added amount (p.p.m. as $R_2O_3$) | Turbidity |
|---|---|---|
| Aluminum sulfate (commercial). | 7.0 | 5.4 |
| | 8.0 | 4.9 |
| | 9.0 | 4.8 |
| | 10.0 | 4.9 |
| Product of Example 6 | 5.0 | 1.5 |
| | 6.0 | 1.4 |
| | 7.0 | 1.0 |
| | 8.0 | 1.0 |

What we claim is:
1. A process for producing basic salts represented by the general formula:

$$R_n(OH)_mX_{3n-m}$$

wherein R is a member selected from the group consisting of Al, Fe and mixtures thereof, X is a monovalent acid radical selected from Cl and $NO_3$, $3n$ is larger than $m$ and the chemical equivalent ratio of R/X is about 1.5 to 4.0; which comprises decomposing an inorganic material containing a member selected from the group consisting of aluminum, iron and mixture thereof with a monovalent strong inorganic acid selected from hydrochloric acid and nitric acid and with sulfuric acid, adding to the resulting solution a substance selected from the group consisting of calcium carbonate, slaked lime, quicklime, dolomite, calcium silicate, barium carbonate and barium hydroxide to convert sulfuric acid ions in said solution into an insoluble salt, removing the insoluble sulfate precipitate thus formed and recovering the solution of said basic salt.

2. A process according to claim 1 wherein said raw material is decomposed with a mixed acid of the monovalent acid and sulfuric acid.

3. A process according to claim 1 wherein said raw material is decomposed separately with the monovalent acid and sulfuric acid and the respective treating solutions are combined prior to the reaction for forming the insoluble sulfate salt.

4. A process according to claim 3 wherein said raw material is decomposed under such condition that chemical equivalent ratios of R/Cl and R/$SO_4$ is within the ranges of about 1.0 to 1.4 and about 0.8 to 1.1, respectively.

5. A process according to claim 1 wherein said raw inorganic material is decomposed in such condition that the chemical equivalent ratio of R/X+$SO_4$ is in a range of about 0.8 to 1.4.

6. A process according to claim 1 wherein said substance is added in such an amount that the resulting solution of the basic salt contains the sulfate radical in an amount of about 3.0%.

7. A process according to claim 6 wherein said substance is added in such an amount that the resulting solution of the basic salt contains the sulfate radical in an amount of less than 2.0%.

8. A process according to claim 1 wherein insoluble residue is separated and removed from the solution resulting from the decomposition of the raw material.

9. A process as claimed in claim 1 wherein the aluminum and/or iron-containing material is selected from bauxite, kaolin, alunite and allophane.

10. A process as claimed in claim 1 wherein the aluminum and/or iron-containing material is selected from filter cake formed in the electrolysis of alumina, red mad, metallic aluminum waste and pyrite.

References Cited

UNITED STATES PATENTS

| 2,566,143 | 8/1951 | Redlich et al. | 23—52 |
| 2,791,486 | 5/1957 | Appell | 23—50 |
| 2,931,706 | 5/1960 | Gresky et al. | 23—102 |

OTHER REFERENCES

Levitskii, "Chemical Abstracts," vol. 55, 1961, p. 11776e.

Tanahe, "American Perfumes and Cosmetics," vol. 77, August 1962, pp. 25–30.

HERBERT T. CARTER, Primary Examiner

U.S. Cl. X.R.

23—50, 87, 92, 102, 122; 210—42, 52; 252—175